3,197,470
3β-HYDROXY-4-PREGNENE DERIVATIVES AND PREPARATION THEREOF

Romano Deghenghi, Westmount, Quebec, and David J. Marshall, Montreal, Quebec, Canada, assignors to American Home Products Corporation, New York, N.Y., a corporation of Delaware
No Drawing. Filed Sept. 20, 1963, Ser. No. 310,476
16 Claims. (Cl. 260—239.55)

The present invention relates to 3β-hydroxy-4-pregnene derivatives and to intermediates used in their preparation. More specifically it relates to 6α,9α-difluoro-3β,11β-dihydroxy - 16α,17α - isopropylidenedioxy-4-pregnen-20-one and to its physiologically acceptable esters of the following general structure

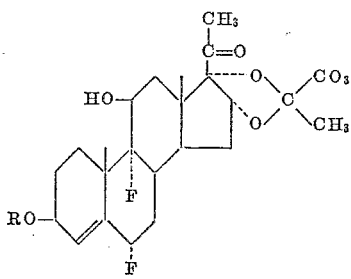

in which R represents hydrogen, an acyl, a cycloalkylacyl, or an aroyl group.

The compounds of this invention are useful as antiinflammatory agents, particularly for topical use. As such, they show a high degree of anti-inflammatory activity in a number of well known and universally recognised tests for determining such anti-inflammatory activity. This activity is indeed surprising and unexpected, because all the compounds with anti-inflammatory activities used in therapy have the characteristic structure of $\Delta^4$-3-ketones of the natural corticoids. In contradistinction to those known substances, the compounds of this invention are allylic 3β-alcohols, or derivatives thereof, and do not possess the $\Delta^4$-3-ketone structure of the natural corticoids. Moreover, they possess the surprising and unpredictable advantage of exhibiting undesirable side effects to a lesser degree than other well-known anti-inflammatory substances. The extent to which they cause reduction in the size and weight of the thymus gland, deposition of liver glycogen, elevation of blood sugar levels, adrenal atrophy, excretion of sodium and potassium, or protein breakdown is smaller in every instance than that obtained with known anti-inflammatory drugs. In addition the compounds of this invention also show a diminished degree of influence upon the blood picture.

Our preferred method for preparing the compounds of this invention may be described as follows.

17α-bromo-6α-fluoropregesterone (I), obtained as described by D. J. Marshall in U.S. Patent No. 2,924,610, is dehydrobrominated by means of lithium chloride in dimethylformamide solution to yield 6α-fluoro-4,16-pregnadiene-3,20-dione (II), a compound previously also described by R. Deghenghi in Can. J. Chem., vol. 38, page 452 (1960). The latter compound is oxidised by means of permanganate in a buffered solution to yield 16α,17α-dihydroxy-6α-fluoro-4-pregnene-3,20-dione (III), a compound previously described by J. Fried, Chem. and Ind., 1961, page 465. Incubation of that latter compound with spores of *Aspergillus ochraceus* and isolation of the product of incubation in the usual manner yields 6α-fluoro-11α,16α,17α - trihydroxy-4-pregnene - 3,20 - dione (IV). The corresponding 16α,17α-isopropylidenedioxy derivative is obtained from that latter compound by treatment with acetone and perchloric acid followed by purification by chromatography, to yield 6α-fluoro-11α-hydroxy-16α,17α-isopropylidenedioxy-4-pregnene-3,20-dione (V). The 11α-hydroxy group of the last-named compound is then mesylated in the usual manner by treatment with methanesulfonyl chloride and pyridine to yield 6α-fluoro-16α,17α - isopropylidenedioxy-11α-mesyloxy-4-pregnene-3,20-dione (VI), from which the elements of methanesulfonic acid are eliminated by treatment with sodium acetate in acetic acid, or with lithium bromide in dimethylformamide, to yield 6α-fluoro-16α,17α-isopropylidenedioxy-4,9(11)-pregnadiene-3,20-dione (VII). The elements of hypobromous acid are added to the latter compound by treating it with perchloric acid and N-bromoacetamide, to obtain 9α-bromo-6α-fluoro-11β-hydroxy-16α,17α - isopropylidenedioxy - 4 - pregnene - 3,20 - dione (VIII), and the latter compound is converted to the corresponding 9β,11β-epoxide by treatment with potassium acetate to obtain 9β,11β - epoxy-6α-fluoro-16α,17α-isopropylidenedioxy - 4 - pregnene - 3,20 - dione (IX). The epoxide ring of the latter compound is opened by means of anhydrous hydrogen fluoride at low temperatures, or by means of aqueous hydrofluoric acid at room temperature, to obtain 6α,9α-difluoro-11β-hydroxy-16α,17α-isopropylidenedioxy-4-pregnene-3,20-dione (X), from which 6α,9α - difluoro-3β,11β-dihydroxy-16α,17α-isopropylidenedioxy-4-pregnen-20-one (XI, R=H) is obtained by selective reduction of the 3-keto group with lithium aluminum tri-t-butoxyhydride at room temperature, in a manner similar to that described by D. J. Marshall in Canadian patent application S.N. 825,294. This procedure is also described in the publication of Marshall et al. in J. Med. Chem., vol. 7, pages 355 to 357. The latter compound may then be converted to the desired esters by treatment with the appropriate acid anhydride or acid halide in the conventional manner.

The above reactions may be schematically indicated by the following formulae in which R is defined as above.

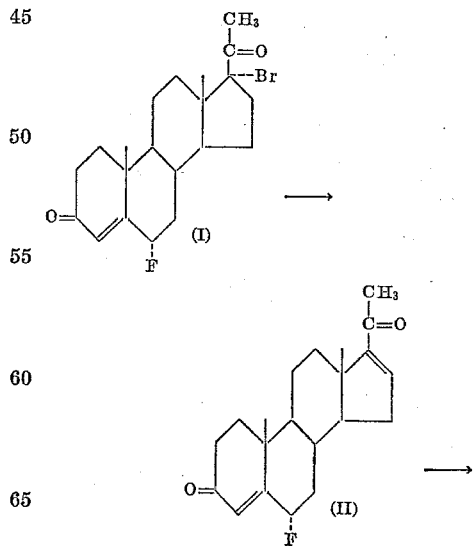

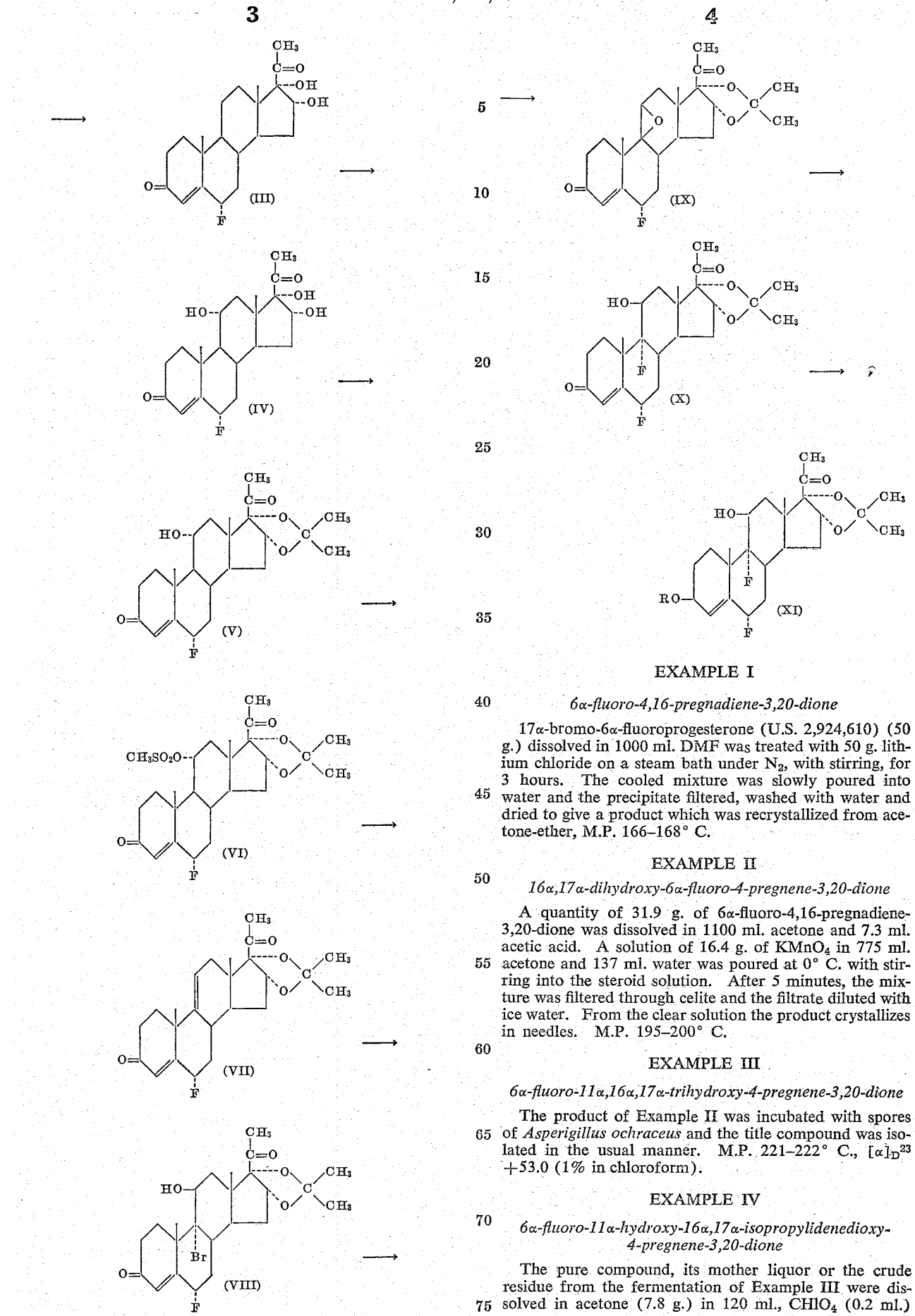

EXAMPLE I

6α-fluoro-4,16-pregnadiene-3,20-dione

17α-bromo-6α-fluoroprogesterone (U.S. 2,924,610) (50 g.) dissolved in 1000 ml. DMF was treated with 50 g. lithium chloride on a steam bath under $N_2$, with stirring, for 3 hours. The cooled mixture was slowly poured into water and the precipitate filtered, washed with water and dried to give a product which was recrystallized from acetone-ether, M.P. 166–168° C.

EXAMPLE II

16α,17α-dihydroxy-6α-fluoro-4-pregnene-3,20-dione

A quantity of 31.9 g. of 6α-fluoro-4,16-pregnadiene-3,20-dione was dissolved in 1100 ml. acetone and 7.3 ml. acetic acid. A solution of 16.4 g. of $KMnO_4$ in 775 ml. acetone and 137 ml. water was poured at 0° C. with stirring into the steroid solution. After 5 minutes, the mixture was filtered through celite and the filtrate diluted with ice water. From the clear solution the product crystallizes in needles. M.P. 195–200° C.

EXAMPLE III

6α-fluoro-11α,16α,17α-trihydroxy-4-pregnene-3,20-dione

The product of Example II was incubated with spores of *Asperigillus ochraceus* and the title compound was isolated in the usual manner. M.P. 221–222° C., $[\alpha]_D^{23}$ +53.0 (1% in chloroform).

EXAMPLE IV

6α-fluoro-11α-hydroxy-16α,17α-isopropylidenedioxy-4-pregnene-3,20-dione

The pure compound, its mother liquor or the crude residue from the fermentation of Example III were dissolved in acetone (7.8 g.) in 120 ml., $CHlO_4$ (0.2 ml.)

was added, and the mixture was left at room temperature for 2.5 hours. A few drops of pyridine were added, the solution concentrated in vacuo, the residue extracted with ether and washed with water. Evaporation of the solvent gave a residue which was recrystallized from acetone to give a product, M.P. 278° C. dec. When using a crude starting material, the pure product was obtained by chromatography on Florisil (10–15% ethyl acetate in benzene). An analytical sample melted at 283–285° C. with decomposition.

Calcd.: C, 68.54; H, 7.91; F, 4.52. Found: C, 68.61; H, 7.68; F, 4.65.

EXAMPLE V

*6α-fluoro-16α,17α-isopropylidenedioxy-11α-mesyloxy-4-pregnene-3,20-dione*

The product of Example IV, 840 mg. (2 mmoles) in 10 ml. $CH_2Cl_2$ was treated with 1 ml. of pyridine and 0.23 ml. methane-sulfonylchloride at room temperature for 22 hours.

The mixture was diluted with ether, washed with dilute CHl and $NaCHO_3$ solution, then with water, to give a residue of colorless crystals suitable for the next step.

A portion was crystallized from methylene dichloride-methanol to M.P. 160–162° C. (dec.) (darkening at 140° C.).

EXAMPLE VI

*6α-fluoro-16α,17α-isopropylidenedioxy-4,9(11)-pregnadiene-3,20-dione*

The crude product from Example V (17.5 g.) was dissolved with warming in 180 cc. acetic acid, 35 g. of sodium acetate were added and the mixture was refluxed under nitrogen for two hours. The usual work-up gave a yellow solid which crystallized from methylene dichloride-methanol to give a crude product, M.P. 226° C. (dec.). Several crystallizations raised the M.P. to 252° C.

Alternatively, the same compound could also be obtained by refluxing the 11α-mesylate obtained in Example V with an equal weight of lithium bromide in dimethyl-formamide for 2 hours. The product was isolated in the usual manner and crystallized from methylene dichloride-methanol.

EXAMPLE VII

*9α-bromo-6α-fluoro-11β-hydroxy-16α,17α-isopropylidenedioxy-4-pregnene-3,20-dione*

The product of Example VI (115 mg.) was dissolved in 2 ml. methylene dichloride and 5.8 ml. of t-butanol. 0.375 ml. of 70% $HClO_4$ in 2.5 ml. $H_2O$ was added, followed by a solution of 50 mg. N-bromoacetamide (NBA) in 2.2 ml. t-BuOH. After stirring at room temperature for 15 minutes, 88 mg. of $Na_2SO_3$ in 4 cc. $H_2O$ added, the solvent partly removed in vacuo at room temperature, water was added, and the precipitate was filtered and washed to obtain crystals, M.P. 175° C. (dec.).

EXAMPLE VIII

*9α,11β-epoxy-6α-fluoro-16α,17α-isopropylidenedioxy-4-pregnene-3,20-dione*

The product from Example VII (10.0 g.), dissolved in acetone (350 ml.), was refluxed overnight with 24.0 g. of potassium acetate. The acetone was removed in vacuo, the residue diluted with methylene dichloride washed with water and dried to give a crystalline residue which was chromatographed on 350 g. of Florisil. Ethyl acetate in benzene (5%) eluted the product M.P. 205–209° C. (dec.).

EXAMPLE IX

*6α,9α-difluoro-11β-hydroxy-16α,17α-isopropylidenedioxy-4-pregnene-3,20-dione*

The product of Example VIII (4.965 g.) dissolved in 50 ml. methylene dichloride was dropped with stirring at −80° C. within 15 minutes in a mixture of 20 g. anhydrous tetrahydrofuran and 10 g. anhydrous hydrogen fluoride. It was kept at 0° C. for 17 hours, poured cautiously into ice-cold bicarbonate solution, and extracted with methylene dichloride to give a yellow residue which was chromatographed on 200 g. Florisil. Ethyl acetate in benzene (4%) eluted the product which after crystallization from acetone ether, had M.P. 264–265° C. (dec.).

Calcd. for $C_{24}H_{32}O_5F_2$: C, 65.73; H, 7.36; F, 8.66. Found: C, 65.81; H, 7.39; F, 8.58. $[\alpha]_D^{23}$ +127.3° C. (1% in chloroform), $\lambda_{max}$ 233.5 m$\mu$, $\epsilon$ 16,200.

Alternatively, the same compound could also be obtained by stirring an heterogeneous mixture of the 9,11-oxide compound (Example VII) with aqueous hydrofluoric acid (48%) at room temperature for 2 hours and by isolating it in the usual way.

EXAMPLE X

*6α,9α-difluoro-3β,11β-dihydroxy-16α,17α-isopropylidenedioxy-4-pregnen-20-one*

The product from Example IX (422 mg.) in 8 ml. tetrahydrofuran was reduced with 725 mg. lithium-aluminum-tri-t-butoxyhydride at room temperature for 4 hours. The residue, after the usual work up, represented a mixture of the two epimeric 3-alcohols.

Recrystallization from ether gave a product M.P. 165° C. (dec.) suitable for the next steps.

EXAMPLE XI

*3β-acetoxy-6α,9α-difluoro-11β-hydroxy-16α,17α-isopropylidenedioxy-4-pregnen-20-one*

The crude product of Example X (375 mg.) was acetylated overnight with 1 ml. acetic anhydride and 5 ml. pyridine. The usual work up gave an amorphous product which was chromatographed on 20 g. of silica gel.

Ethyl acetate in benzene (5%) eluted a crystalline fraction which was recrystallized for analysis from ether to M.P. 212–213° C. (dec.), $[\alpha]_D^{23}$ +66.9° C. (1% in chloroform).

Calcd. for $C_{26}H_{36}O_6F_2$: C, 64.71; H, 7.52; F, 7.87. Found: C, 64.76; H, 7.45; F, 7.89

EXAMPLE XII

*6α,9α-difluoro-3β,11β-dihydroxy-16α,17α-isopropylidenedioxy-4-pregnen-20-one 3-hexanoate*

The product of Example X was treated at room temperature overnight with a molar excess of hexanoic anhydride in pyridine. The title compound was isolated in the usual manner and purified by chromatography.

EXAMPLE XIII

*6α,9α-difluoro-3β,11β-dihydroxy-16α,17α-isopropylidenedioxy-4-pregnen-20-one 3-cyclopentylpropionate*

The product of Example X was treated at room temperature with a molar excess of cyclopentylpropionyl-chloride in pyridine for 16 hours.

The product was isolated and purified in the usual manner.

EXAMPLE XIV

*6α,9α-difluoro-3β,11β-dihydroxy-16α,17α-isopropylidenedioxy-4-pregnen-20-one 3-benzoate*

By substituting benzoyl chloride in Example XIII the title compound was similarly obtained.

EXAMPLE XV

*6α,9α-difluoro-3β,11β-dihydroxy-16α,17α-isopropylidenedioxy-4-pregnen-20-one 3t-butylacetate*

The product of Example X was treated with a molar excess of t-butylacetyl chloride in pyridine at room temperature, and the title compound was isolated as usual, M.P. 246–248° C., $[\alpha]_D^{23}$ +74.4 (1% in chloroform).

Calcd. for $C_{30}H_{44}O_6F_2$: C, 66.89; H, 8.23; F, 7.05. Found: C, 66.64; H, 8.19; F, 7.03.

We claim:

1. Pregnene derivatives of the following structure

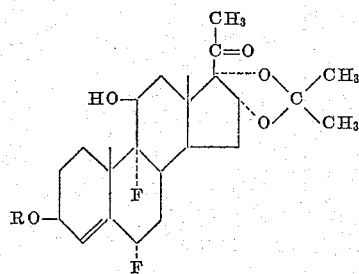

in which R is selected from the group consisting of hydrogen, lower aliphatic acyl groups containing from two to six carbon atoms, cyclopentylpropionyl, and benzoyl groups.

2. 6α,9α - difluoro - 3β,11β - dihydroxy - 16α,17α - isopropylidenedioxy-4-pregnen-20-one.

3. 3β - acetoxy - 6α,9α - difluoro - 11β - hydroxy-16α,17α-isopropylidenedioxy-4-pregnen-20-one.

4. 6α,9α - difluoro - 3β,11β - dihydroxy - 16α,17α - isopropylidenedioxy-4-pregnen-20-one 3-hexanoate.

5. 6α,9α - difluoro - 3β,11β - dihydroxy - 16α,17α - isopropylidenedioxy-4-pregnen-20-one 3-t-butylacetate.

6. 6α,9α-difluoro - 3β,11β - dihydroxy - 16α,17α - isopropylidenedioxy-4-pregnen-20-one 3-cyclopentylpropionate.

7. 6α,9α - difluoro - 3β,11β - dihydroxy - 16α,17α - isopropylidenedioxy-4-pregnen-20-one 3-benzoate.

8. 6α, - fluoro - 11α,16α,17α - trihydroxy - 4 - pregnene-3,20-dione.

9. 6α - fluoro - 11α - hydroxy - 16α,17α - isopropylidenedioxy-4-pregnene-3,20-dione.

10. 6α - fluoro - 16α,17α - isopropylidenedioxy - 11α-mesyloxy-4-pregnene-3,20-dione.

11. 6α - fluoro - 16α,17α - isopropylidenedioxy - 4,9 (11)-pregnadiene-3,20-dione.

12. 9α - bromo - 6α - fluoro - 11β - hydroxy - 16α,17α-isopropylidenedioxy-4-pregnene-3,20-dione.

13. 9β,11β - epoxy - 6α - fluoro - 16α,17α - isopropylidenedioxy-4-pregnene-3,20-dione.

14. 6α,9α - difluoro - 11β - hydroxy - 16α,17α - isopropylidenedioxy-4-pregnene-3,20-dione.

15. A process for the preparation of pregnene derivatives of the formula:

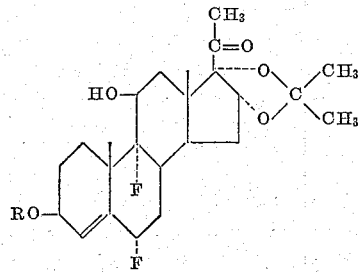

in which R represents hydrogen, comprising, heating 17α-bromo-6α-fluoroprogesterone in solution in dimethylformamide with lithium chloride to obtain 6α-fluoro-4,16-pregnadiene-3,20-dione; treating the latter compound with permanganate in a buffered solution to obtain 16α,17α-dihydroxy - 6α-fluoro - 4-pregnene-3,20- dione; incubating that latter compound with spores of *Aspergillus ochraceus* to obtain 6α - fluoro-11α,16α,17α - trihydroxy-4-pregnene-3,20-dione; treating the latter compound with acetone in the presence of a mineral acid to obtain 6α-fluoro-11α-hydroxy - 16α,17α - isopropylidenedioxy-4-pregnene-3,20-dione; treating the latter compound with methanosulfonyl chloride and pyridine to obtain 6α-fluoro-16α,17α-isopropylidenedioxy - 11α-mesyloxy-4-pregnene - 3,20-dione; heating the latter compound with pyridine to obtain 6α - fluoro - 16α,17α - isopropylidenedioxy - 4,9(11)-pregnadiene-3,20-dione; stirring a solution of the latter compound with a mineral acid and an N-bromoamide to obtain 9α - bromo - 6α - fluoro - 11β - hydroxy - 16α,17α-isopropylidenedioxy-4-pregnene-3,20-dione; heating the latter compound with potassium acetate to obtain 9β,11β-epoxy - 6α - fluoro - 16α,17α - isopropylidenedioxy-4-pregnene-3,20-dione; treating the latter compound with a reagent selected from the group consisting of anhydrous hydrogen fluoride and aqueous hydrofluoric acid to obtain 6α,9α - difluoro - 11β - hydroxy - 16α,17α - isopropylidenedioxy -4-pregnene-3,20-dione; and stirring a solution of the latter compound with a solution of lithium aluminum tri-t-butoxyhydride to obtain 6α,9α-difluoro-3β,11β-dihydroxy - 16α,17α-isopropylidenedioxy - 4 - pregnen-20-one.

16. A process for the preparation of pregnene derivatives of the formula:

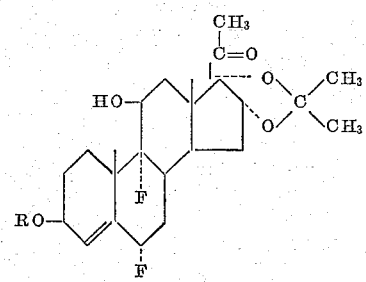

in which R represents a radical selected from the group consisting of acetyl, hexanoyl, t-butylacetyl, cyclopentylpropionyl, and benzoyl radicals, comprising, heating 17α-dihydroxy-6α-fluoro-4-pregnene-3,20-dione; incubatformamide with lithium chloride to obtain 6α-fluoro-4,16-pregnadiene-3,20-dione; treating the latter compound with permanganate in a buffered solution to obtain 16α-17α-dihydroxy-6α-fluoro-4-pregnene-3,20-dione; incubating that latter compound with spores of *Aspergillus ochraceus* to obtain 6α-fluoro-11α,16α,17α-trihydroxy-4-pregnene-3,20-dione; treating the latter compound with acetone in the presence of a mineral acid to obtain 6α-fluoro - 11α - hydroxy - 16α,17α-isopropylidenedioxy-4-pregnene-3,20-dione; treating the latter compound with methanesulfonyl chloride and pyridine to obtain 6α-fluoro-16α,17α - isopropylidenedioxy - 11α-mesyloxy-4-pregnene-3,20-dione; heating the latter compound with acetic acid and sodium acetate to obtain 6α-fluoro-16α,17α-isopropylidenedioxy-4,9(11)-pregnadiene-3,20-dione; stirring a solution of the latter compound with a mineral acid and an N-bromoamide to obtain 9α-bromo-6α-fluoro-11β-hydroxy - 16α,17α - isopropylidenedioxy-4-pregnene-3,20-dione; heating the latter compound with potassium acetate to obtain 9β,11β-epoxy-6α-fluoro-16α,17α-isopropylidenedioxy-4-pregnene-3,20-dione; treating the latter compound with a reagent selected from the group consisting of anhydrous hydrogen fluoride and aqueous hydrofluoric acid to obtain 6α,9α-difluoro-11β-hydroxy-16α,17α-isopropylidenedioxy-4-pregnene-3,20-dione; stirring a solution of the latter compound with a solution of lithium aluminum tri-t-butoxyhydride to obtain 6α,9α-difluoro-3β,11β - dihydroxy - 16α,17α - isopropylidene - dioxy-4-pregnen-20-one; and treating the latter compound with a reagent selected from the group consisting of acetic anhydride, hexanoic anhydride, t-butylacetyl chloride, cyclopentylpropionyl chloride, and benzoyl chloride, to obtain, respectively, 3β - acetoxy - 6α,9α - difluoro - 11β-hydroxy - 16α,17α - isopropylidenedioxy - 4 - pregnen-20 - one, 6α,9α - difluoro - 3β,11β - dihydroxy - 16α,17α-isopropylidenedioxy - 4 - pregnen - 20 - one 3 - hexanoate, 6α,9α-difluoro-3β,11β-dihydroxy-16α,17α-isopropylidenedioxy-4-pregnen-20-one 3-t-butylacetate, 6α,9α-difluoro - 3β,11β - dihydroxy - 16α,17α - isopropylidenedioxy-4-pregnen-20-one 3 cyclopentylproprionate, and 6α,9α - difluoro - 3β,11β - dihydroxy - 16α,17α - isopropylidenedioxy-4-pregnen-20-one 3-benzoate.

References Cited by the Examiner

UNITED STATES PATENTS 3,064,017  11/62  Figdor et al. _____ 260—397.45

LEWIS GOTTS, *Primary Examiner.*

UNITED STATES PATENT OFFICE
CERTIFICATE OF CORRECTION

Patent No. 3,197,470                            July 27, 1965

Romano Deghenghi et al.

It is hereby certified that error appears in the above numbered patent requiring correction and that the said Letters Patent should read as corrected below.

Column 4, formula "(X)", for that portion of the formula reading

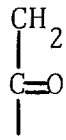         read        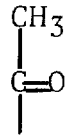

column 7, line 38, for "6α,-fluoro" read -- 6α-fluoro --; column 8, line 43, beginning with "17α-dihydroxy-" strike out all to and including "20-dione;" in line 47, and insert instead -- 17α-bromo-6α-fluoroprogesterone in solution in dimethylformamide with lithium chloride to obtain 6α-fluoro-4,16-pregnadiene-3,20-dione; treating the latter compound with permanganate in a buffered solution to obtain 16α,17α-dihydroxy-6α-fluoro-4-pregnene-3,20-dione; --.

Signed and sealed this 8th day of February 1966.

(SEAL)
Attest:

ERNEST W. SWIDER                                EDWARD J. BRENNER
Attesting Officer                              Commissioner of Patents